US008627218B2

(12) United States Patent
Sim et al.

(10) Patent No.: US 8,627,218 B2
(45) Date of Patent: Jan. 7, 2014

(54) HOST IMPLEMENTED METHOD FOR CUSTOMISING A SECONDARY DEVICE

(75) Inventors: Wong Hoo Sim, Singapore (SG); Teck Chee Lee, Singapore (SG); Peng Kheong Lam, Singapore (SG); Aik Tat Tan, Singapore (SG)

(73) Assignee: Creative Technology Ltd, Singapore (SG)

( * ) Notice: Subject to any disclaimer, the term of this patent is extended or adjusted under 35 U.S.C. 154(b) by 1079 days.

(21) Appl. No.: 11/844,981

(22) Filed: Aug. 24, 2007

(65) Prior Publication Data

US 2009/0055758 A1   Feb. 26, 2009

(51) Int. Cl.
*G06F 3/00* (2006.01)
(52) U.S. Cl.
USPC ............ 715/762; 715/761; 715/731; 717/168
(58) Field of Classification Search
USPC ................... 715/744, 762, 761, 731; 717/168
See application file for complete search history.

(56) References Cited

U.S. PATENT DOCUMENTS

| | | | |
|---|---|---|---|
| 6,211,870 B1* | 4/2001 | Foster | 715/744 |
| 2004/0037243 A1* | 2/2004 | Inoue et al. | 370/329 |
| 2006/0019607 A1* | 1/2006 | Kim et al. | 455/67.14 |
| 2006/0026527 A1 | 2/2006 | Bells | |
| 2006/0050142 A1* | 3/2006 | Scott et al. | 348/14.05 |
| 2007/0061714 A1* | 3/2007 | Stuple et al. | 715/529 |
| 2007/0078899 A1* | 4/2007 | Gulin et al. | 707/200 |
| 2007/0112985 A1 | 5/2007 | Law et al. | |
| 2007/0169087 A1* | 7/2007 | Fadell | 717/168 |
| 2007/0209004 A1* | 9/2007 | Layard | 715/731 |
| 2008/0005121 A1* | 1/2008 | Lam et al. | 707/10 |

FOREIGN PATENT DOCUMENTS

| | | |
|---|---|---|
| JP | 2002-244969 A | 8/2002 |
| WO | 0039772 A1 | 7/2000 |

OTHER PUBLICATIONS

Fu et al.; A framework for device capability on demand and virtual device user experience; 2004; IEEE; pp. 635-648.*
Schilit et al; Web Interaction Using Very Small Internet Devices; © 2002; IEEE; pp. 37-45.*
Marsic et al; Adaptive Collaboration for Wired and Wireless platforms; © 2001; IEEE; pp. 26-35.*

* cited by examiner

*Primary Examiner* — Linh K Pham
(74) *Attorney, Agent, or Firm* — Creative Technology Ltd

(57) ABSTRACT

There is provided a host implemented method for redefining at least one user interface element on a secondary device. The method may include connecting the secondary device to the host for communication between the host and the secondary device; redefining the at least one user interface element using an application running on the host; reviewing the at least one user interface element as redefined using the application (possibly including a visual preview of the at least one user interface element as redefined when viewed on the secondary device); determining whether the secondary device is able to support the at least one user interface element as redefined using the application; and incorporating the at least one user interface element redefined using the application onto the secondary device.

11 Claims, 20 Drawing Sheets

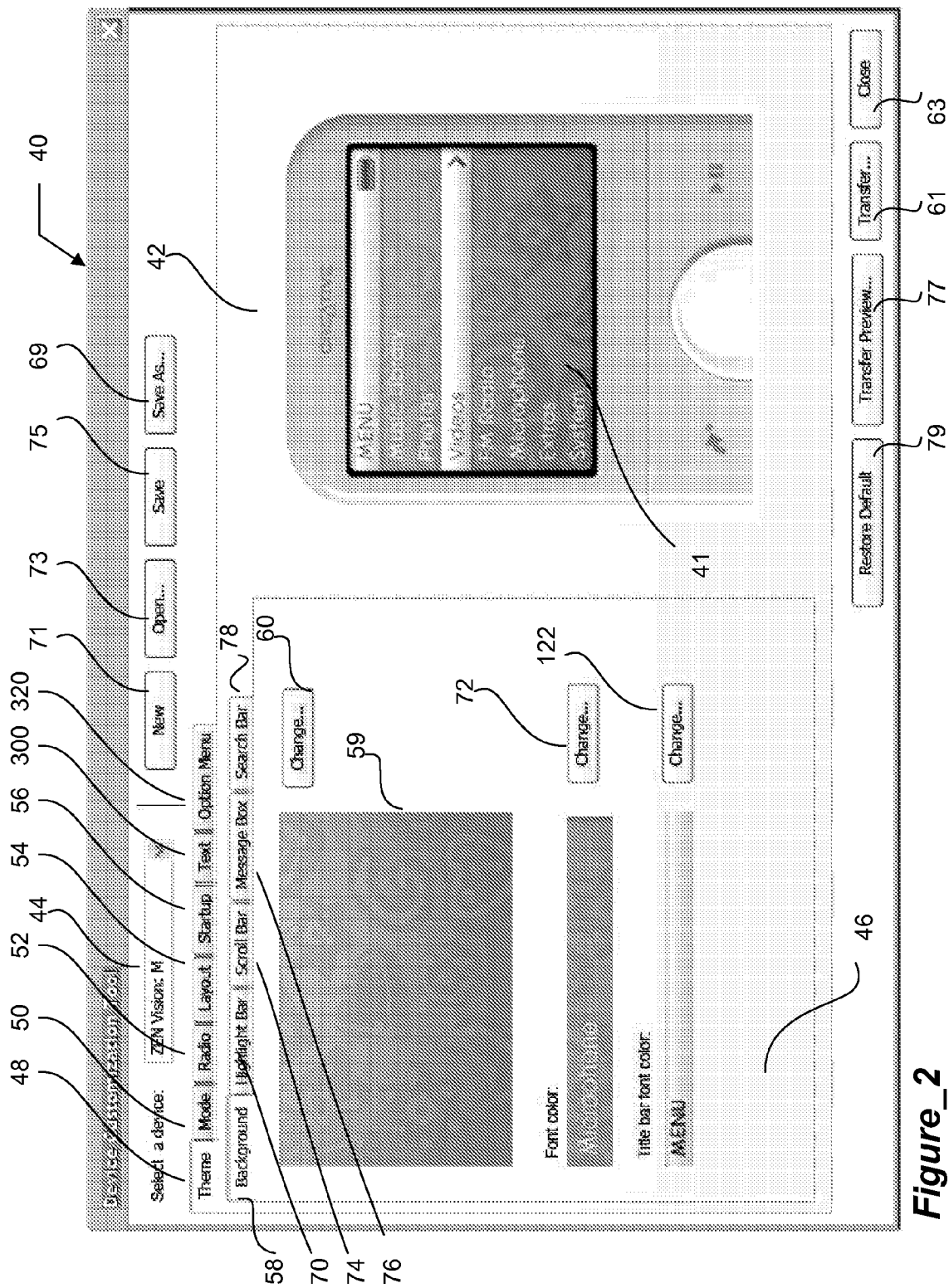
Figure_2

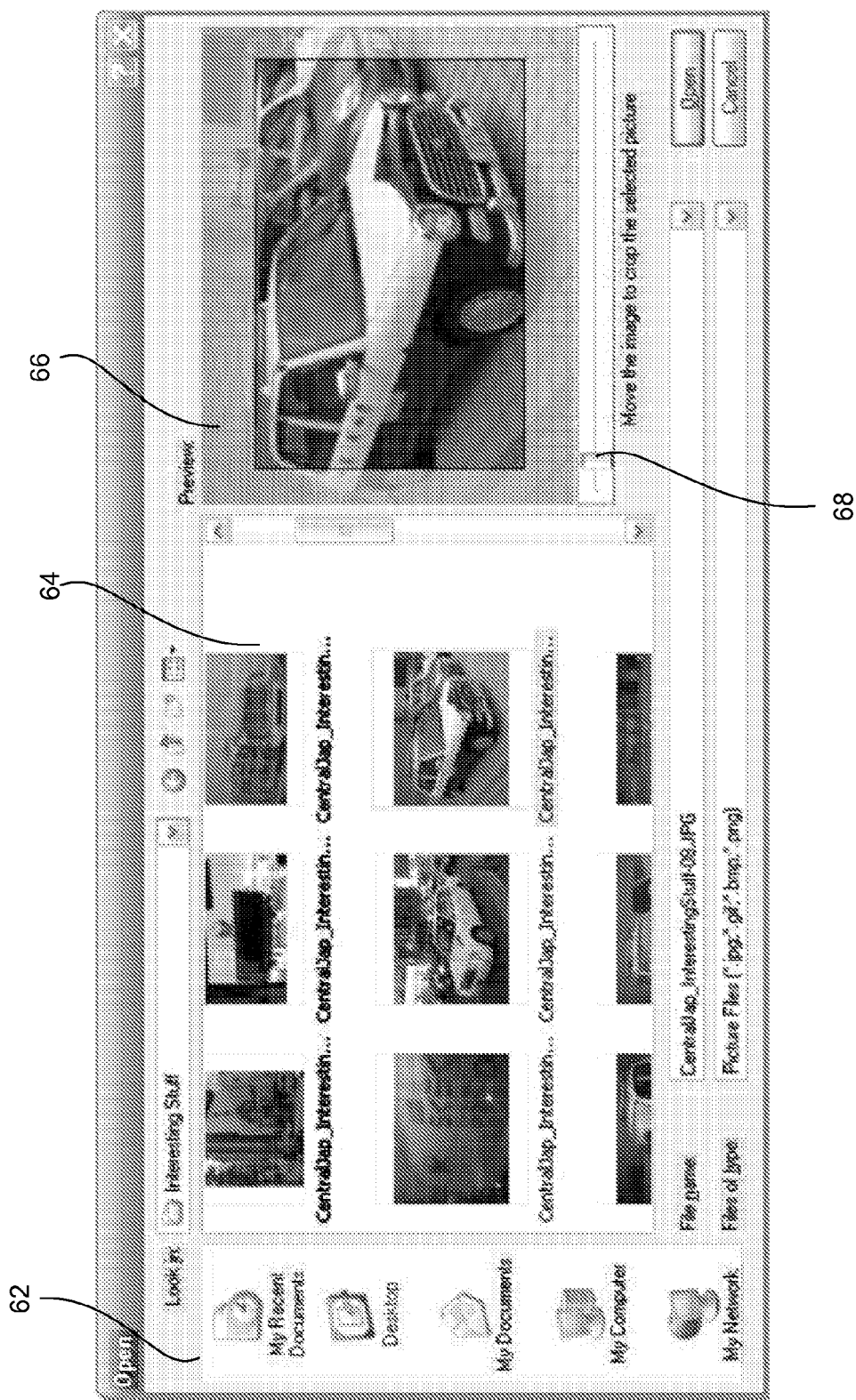
Figure_3

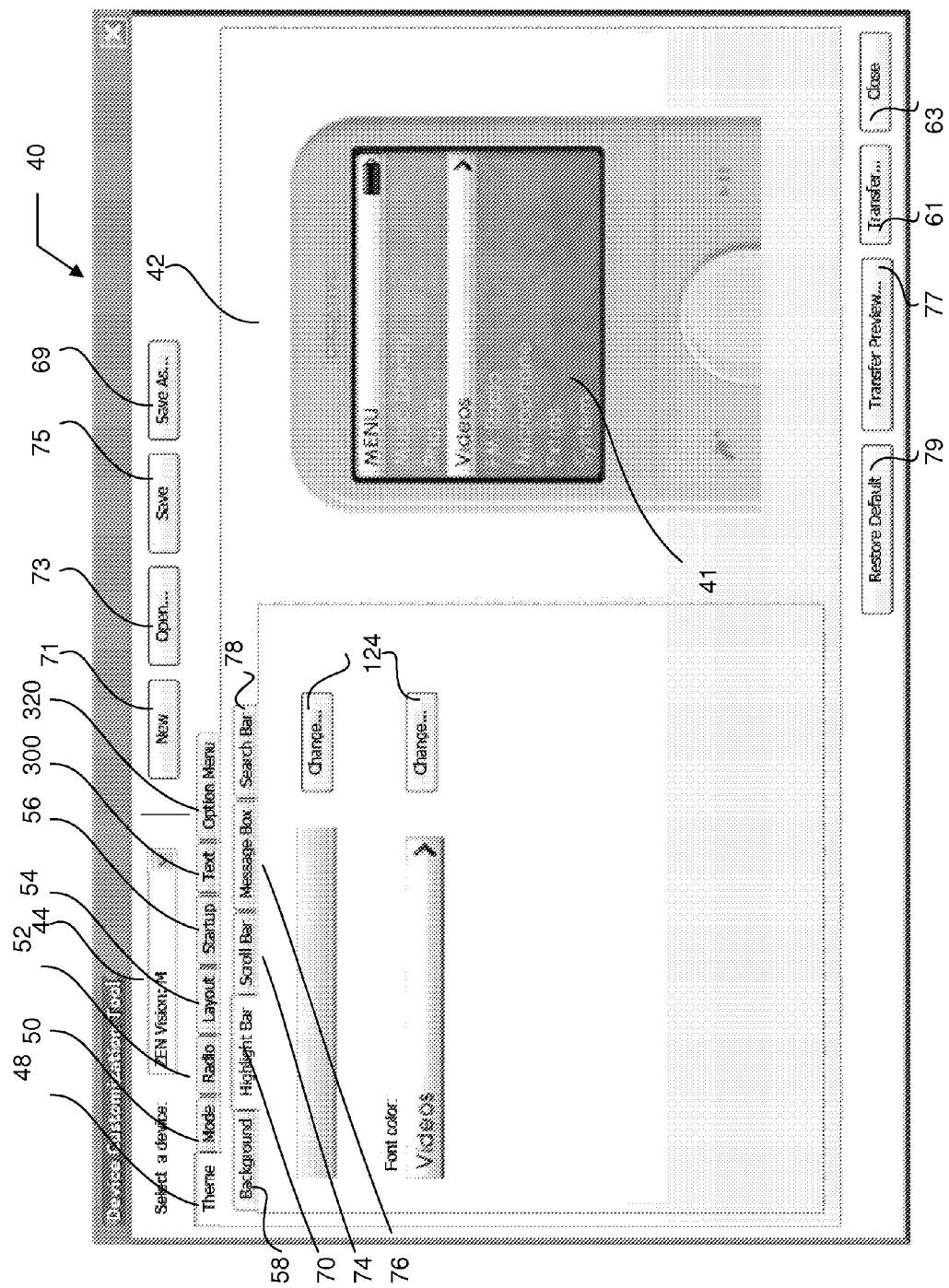
Figure_4

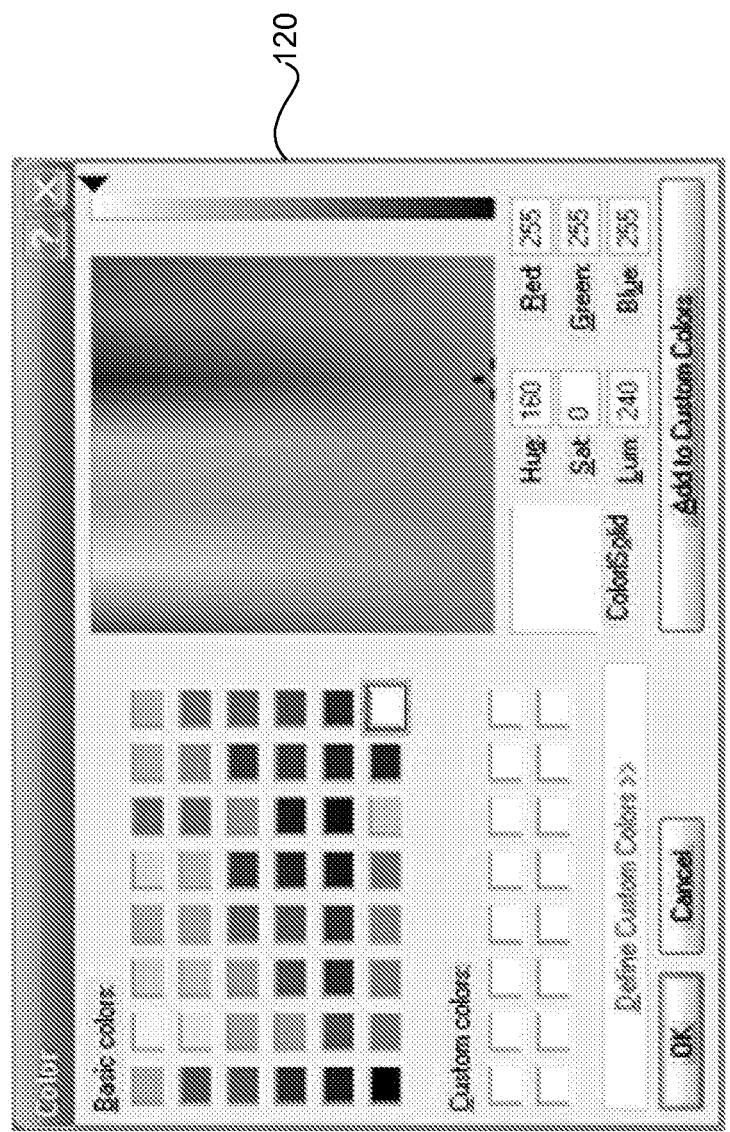
Figure_5

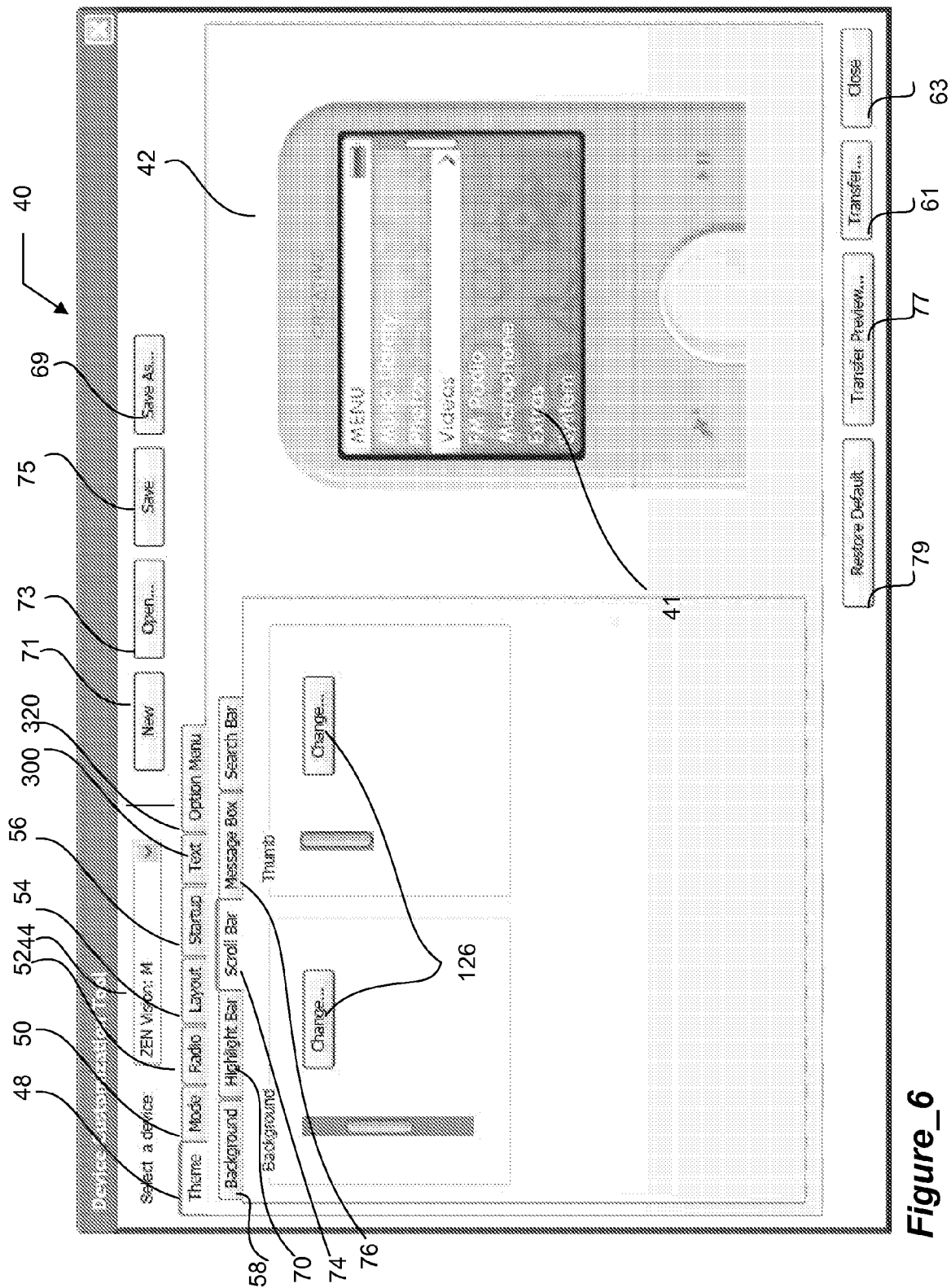
Figure_6

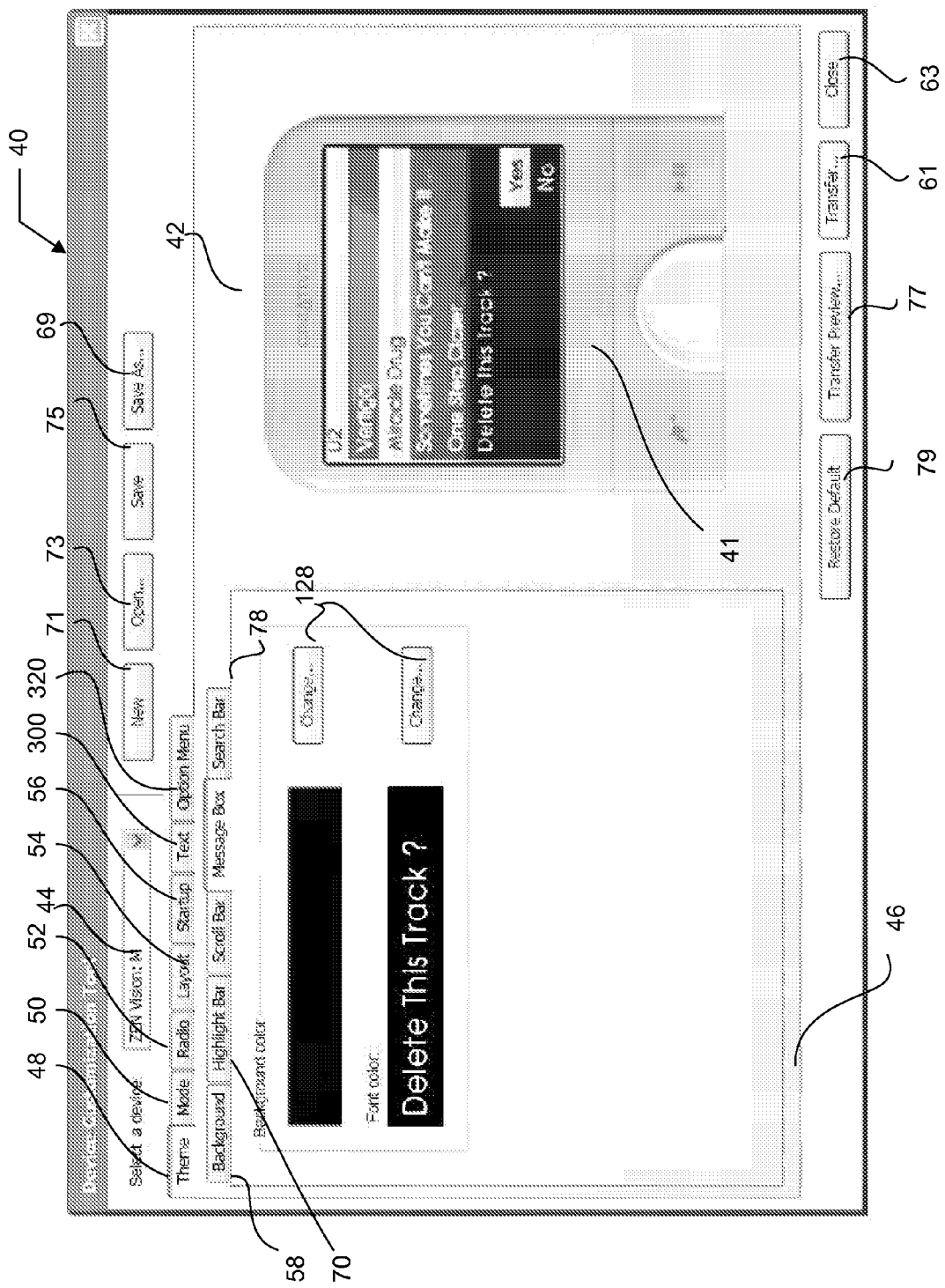
Figure_7

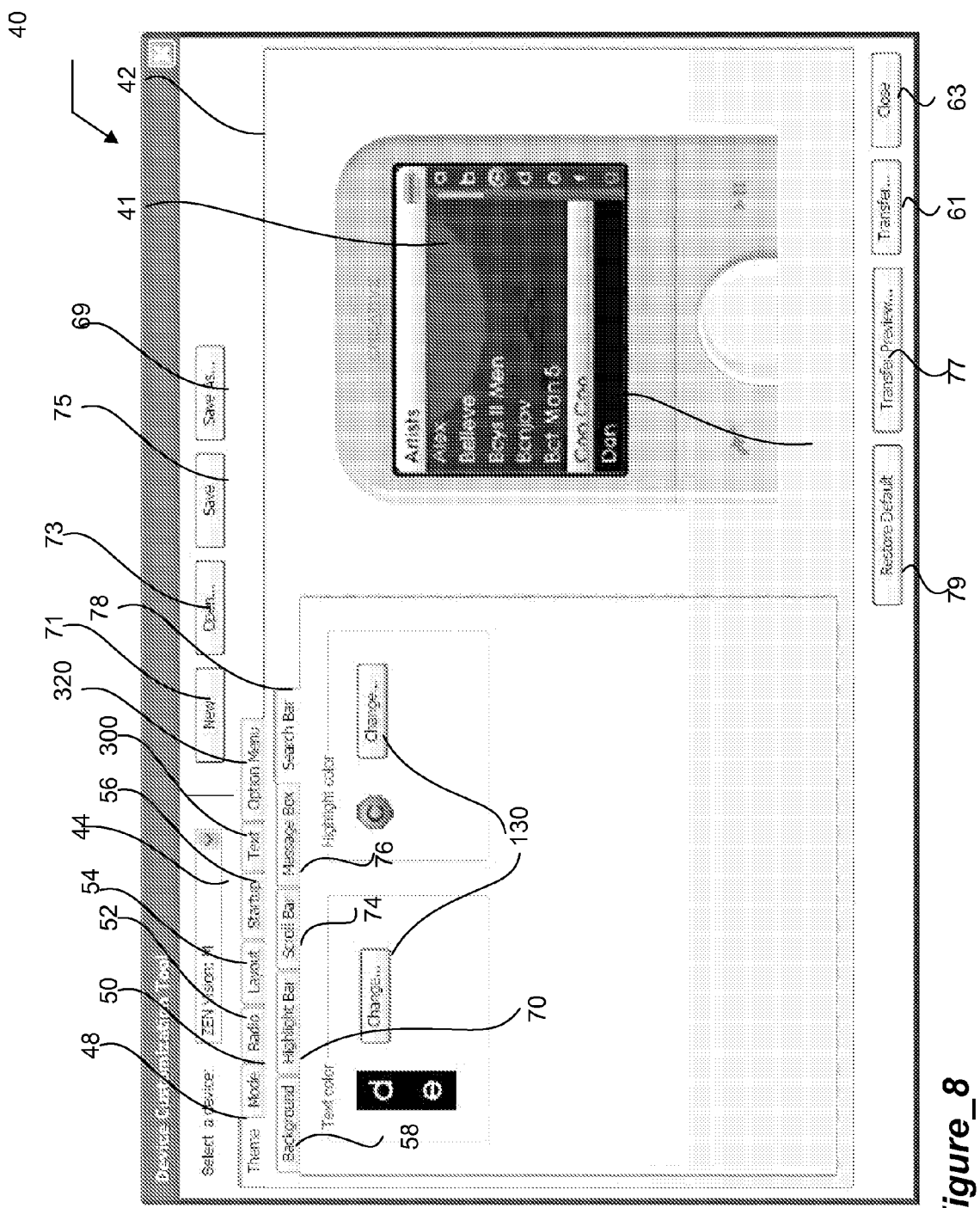
Figure_8

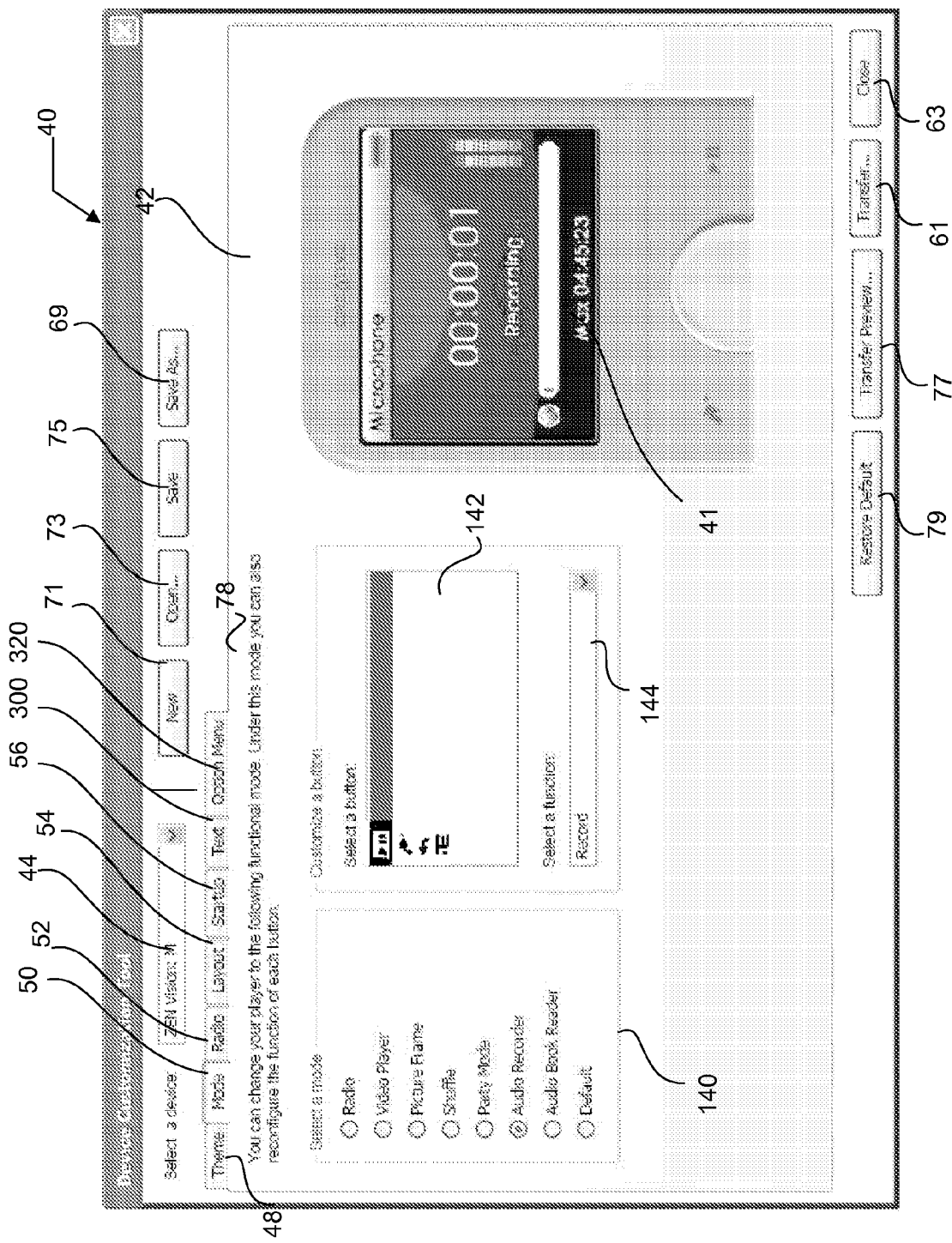
Figure_9

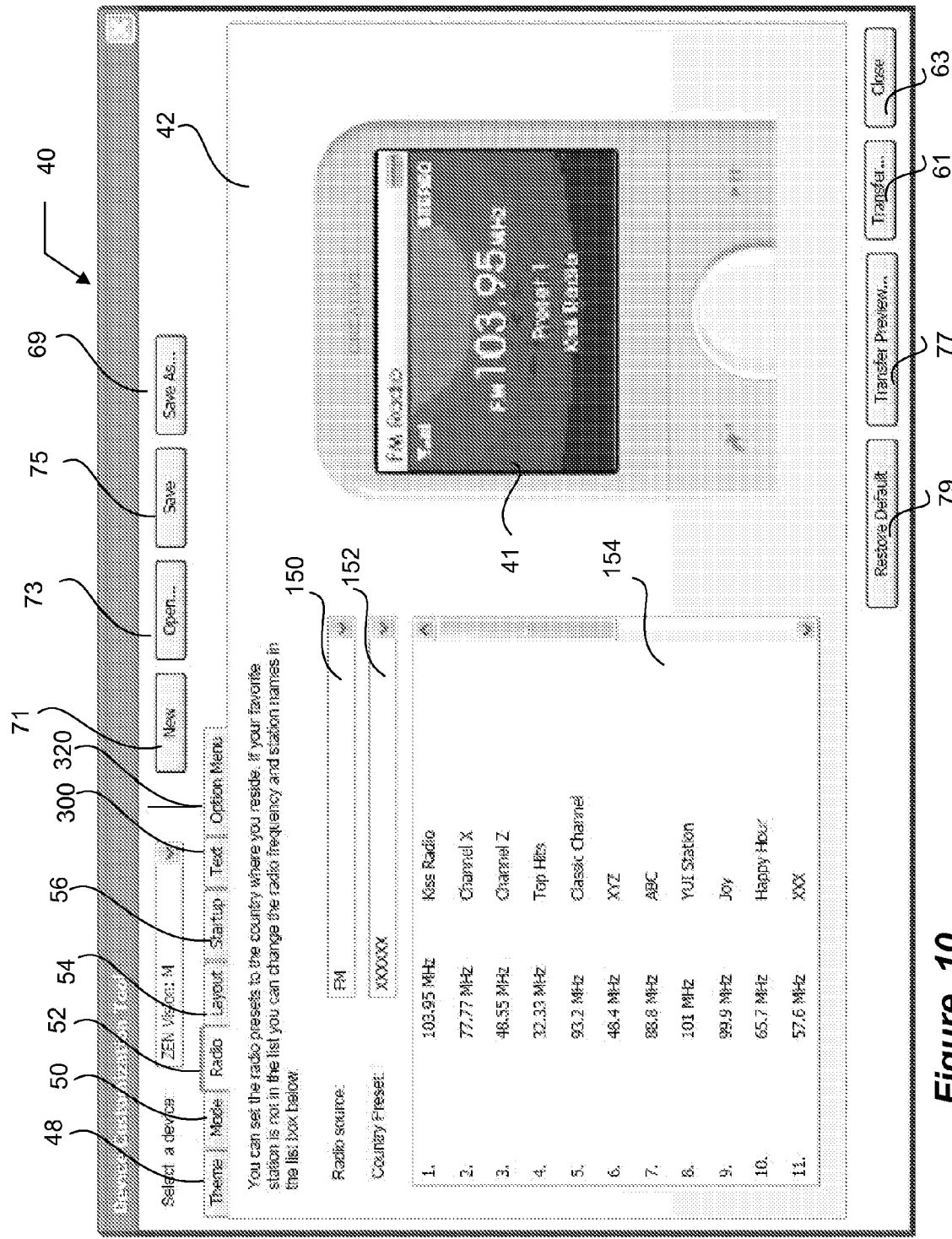
Figure_10

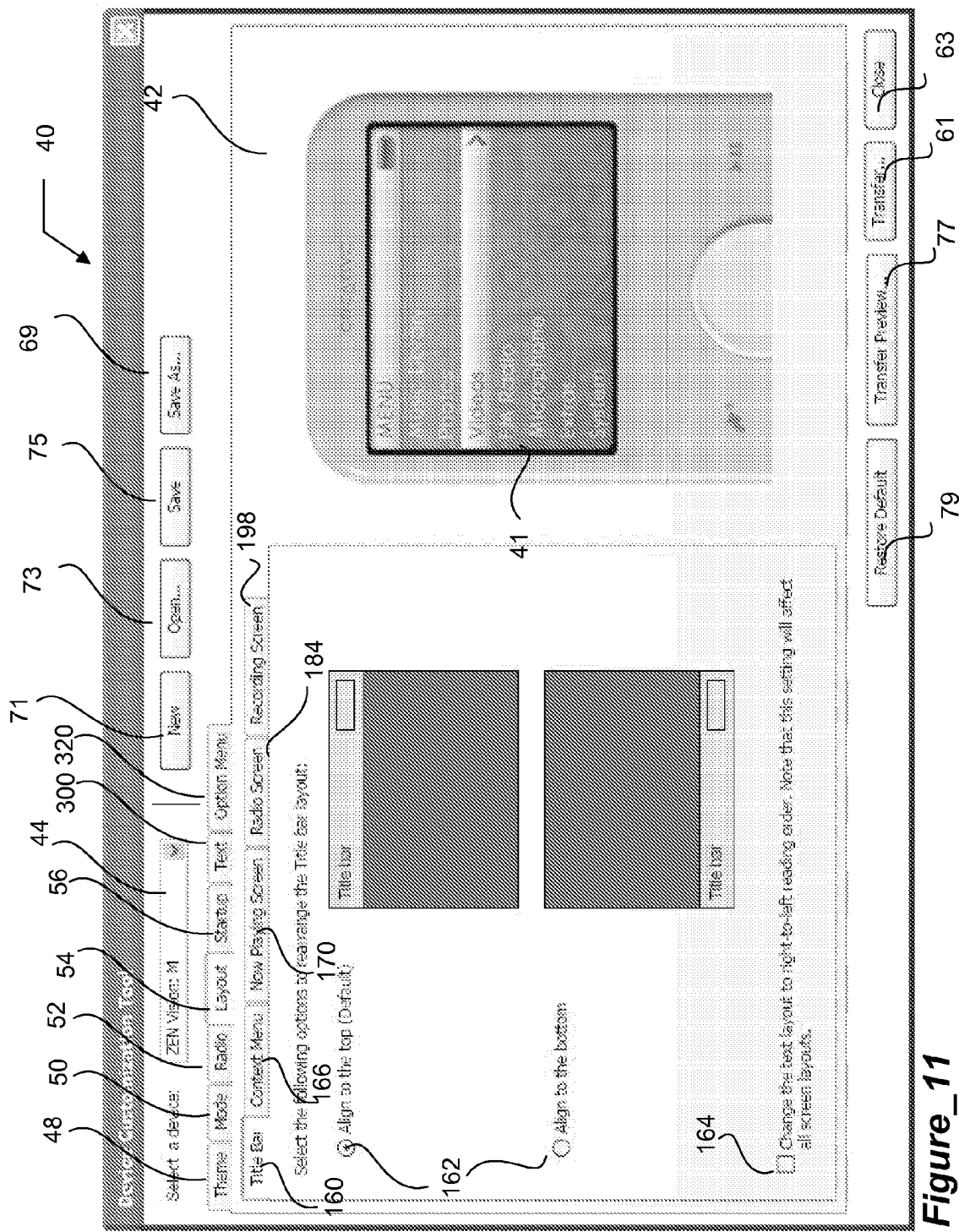
Figure_11

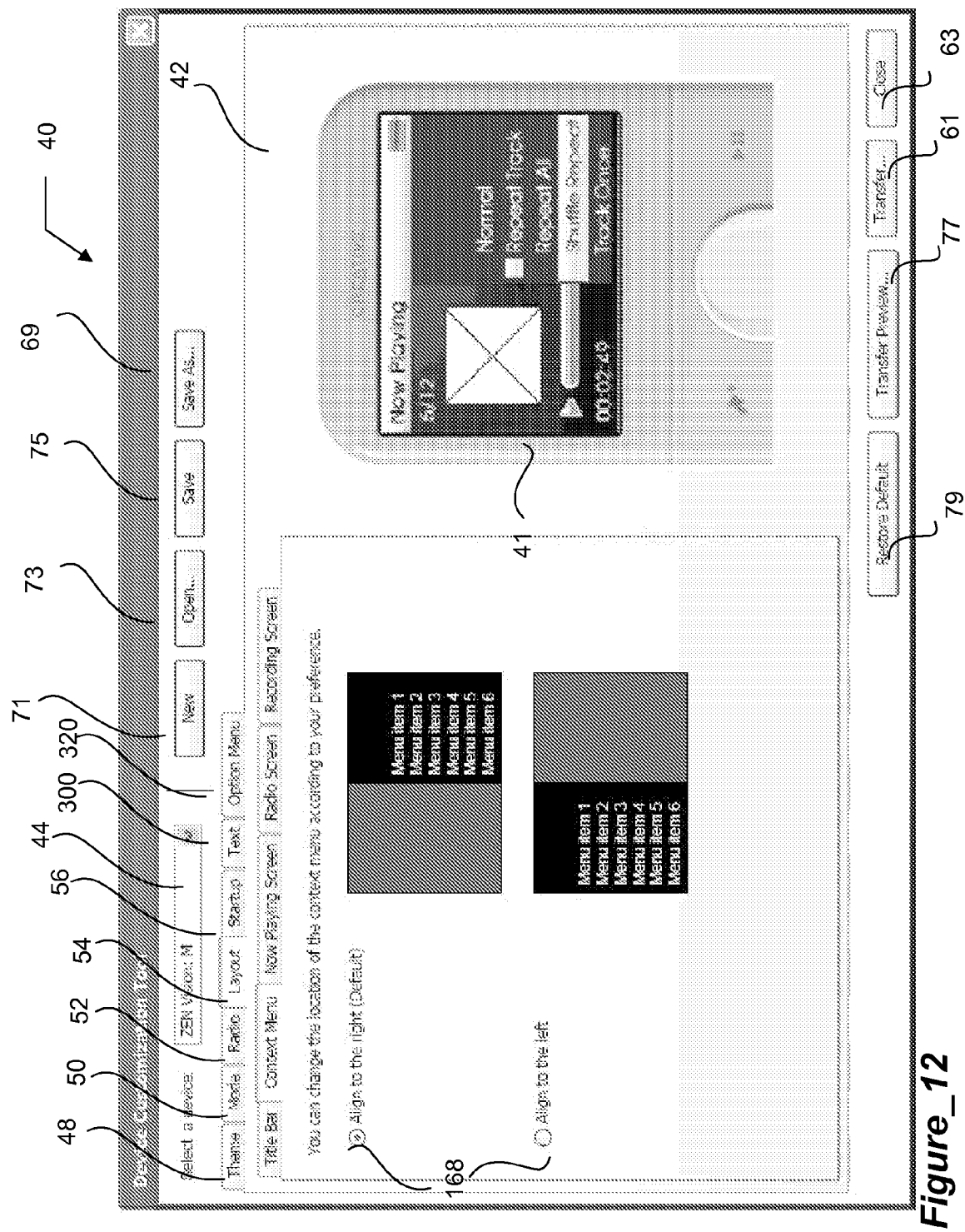
Figure_12

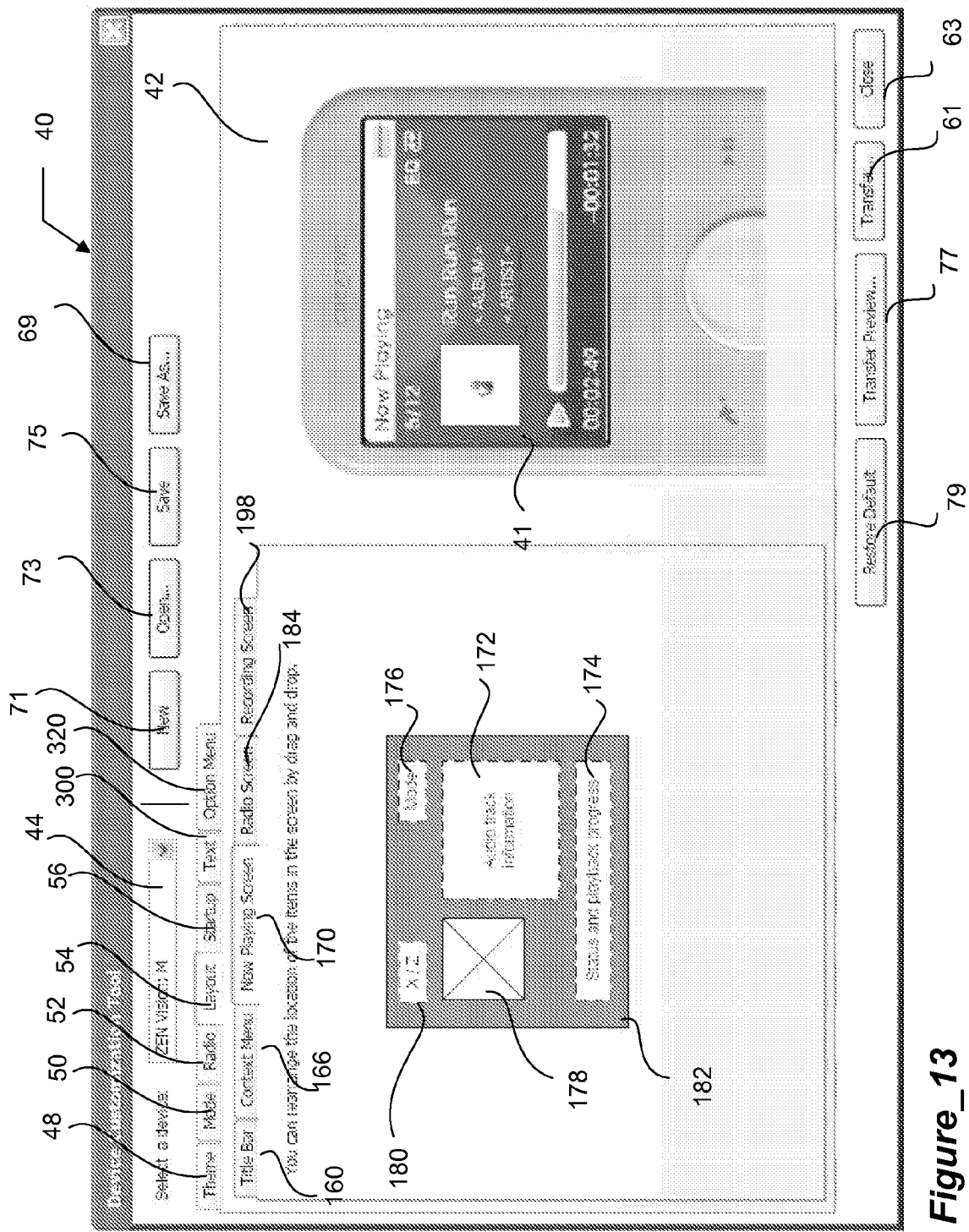
Figure_13

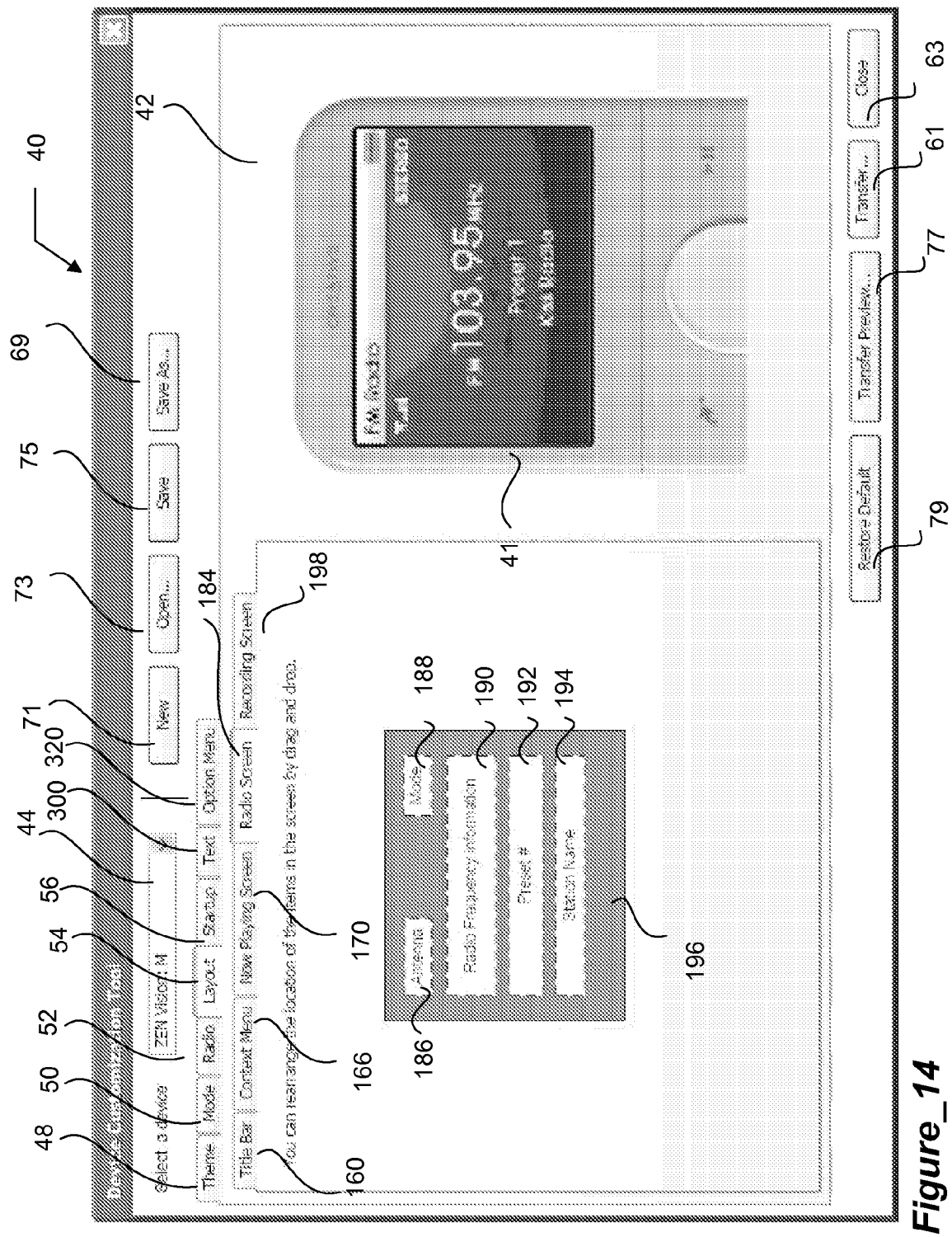
Figure_14

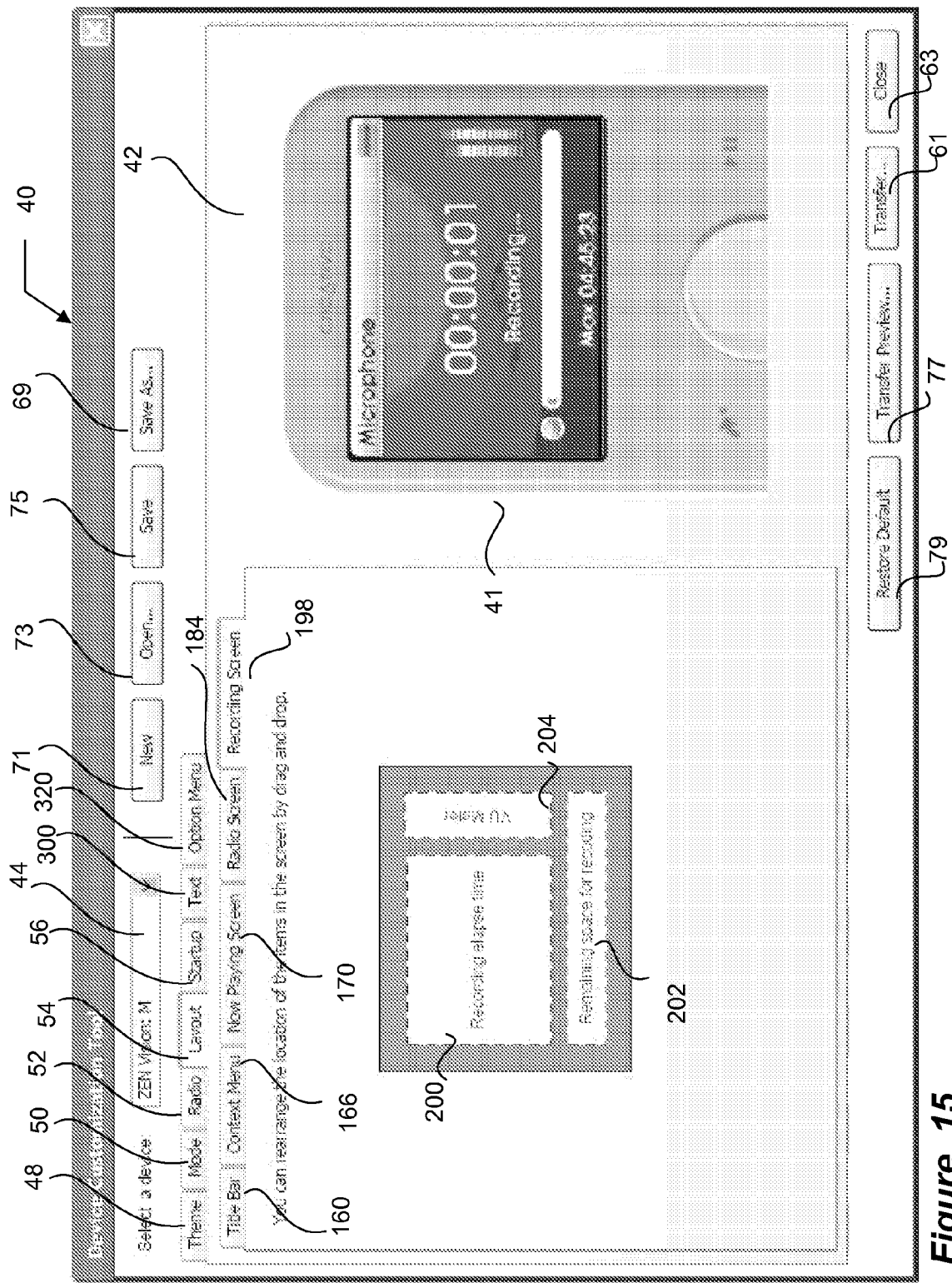

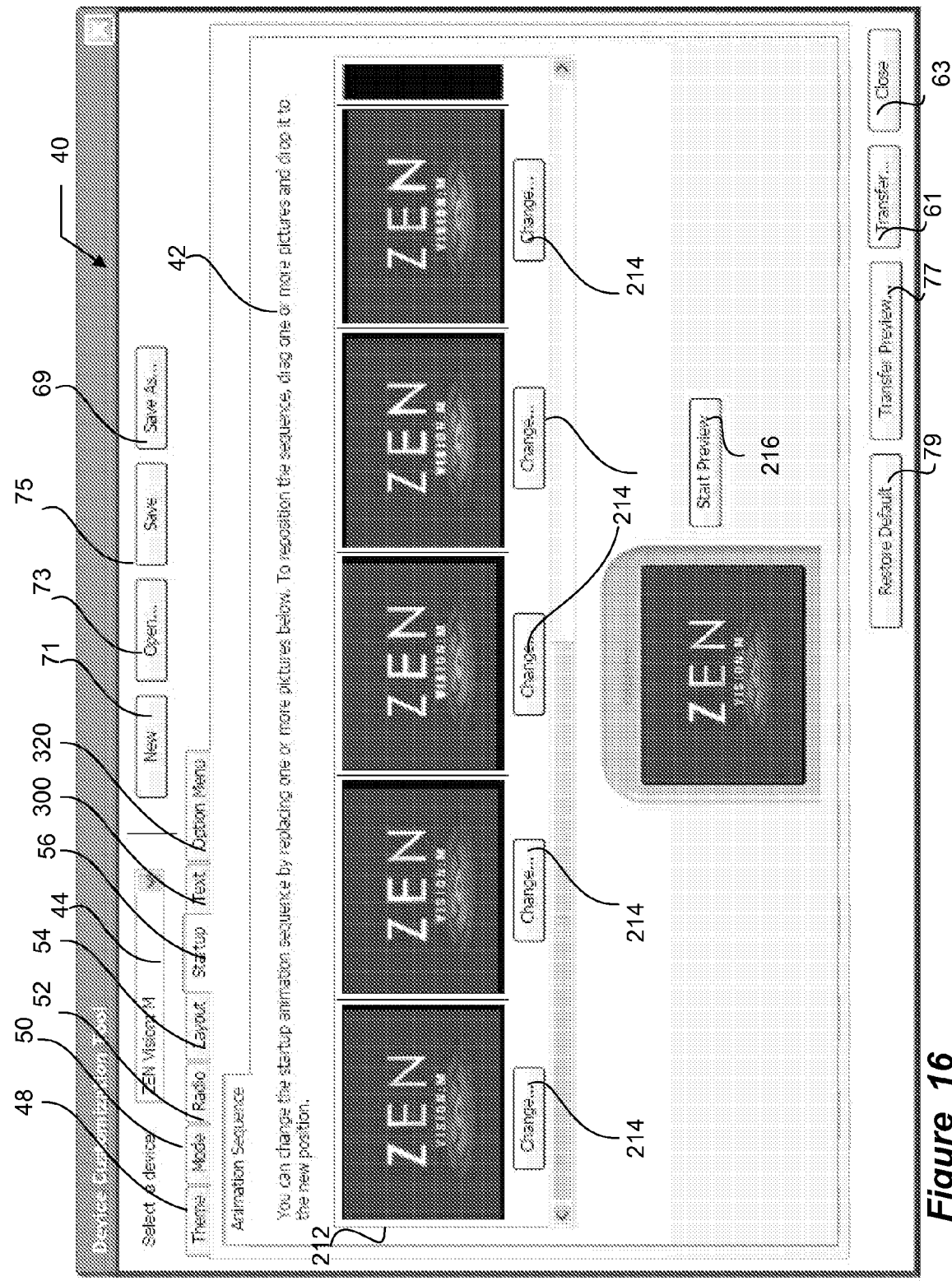
Figure_16

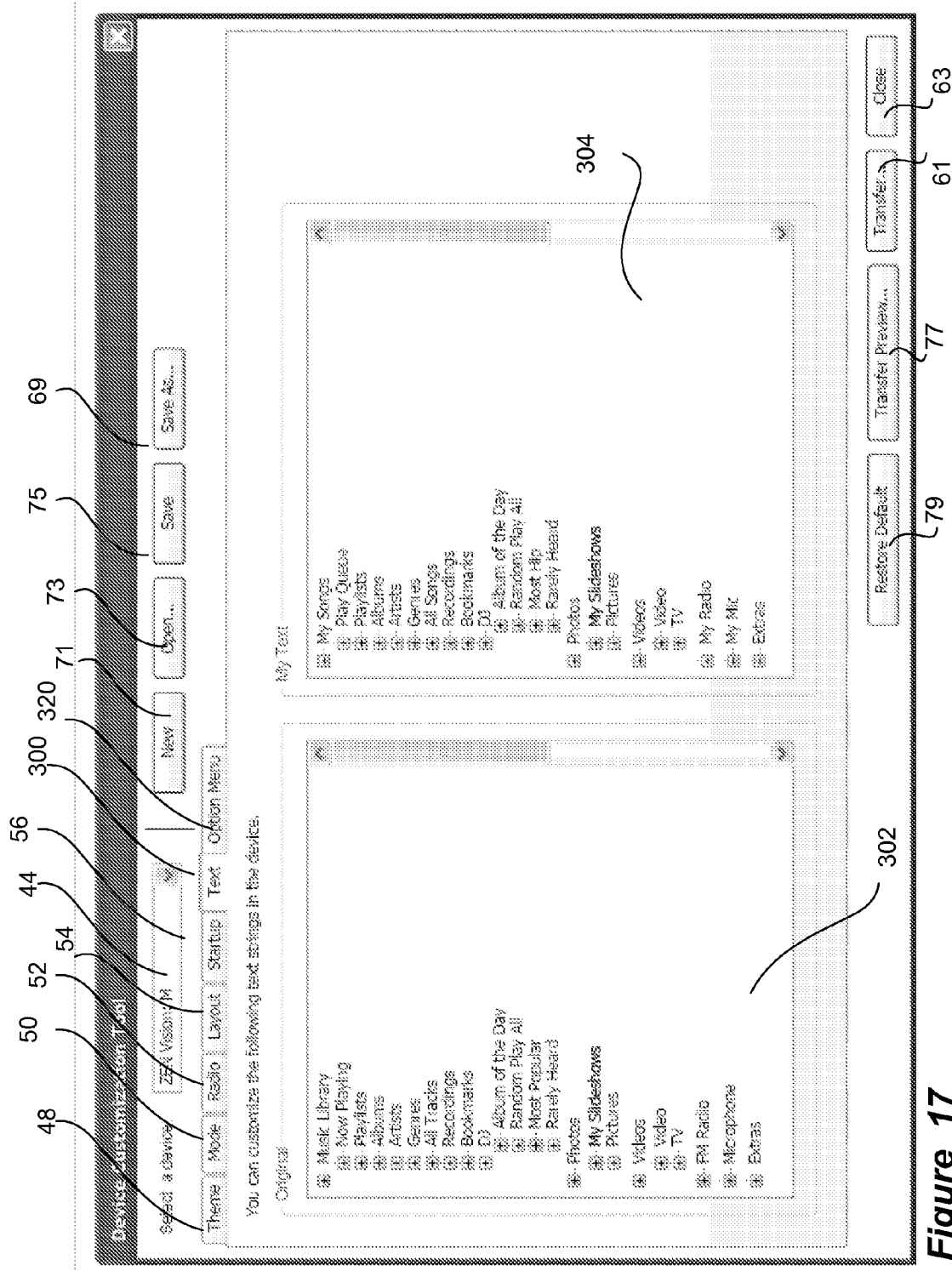
Figure_17

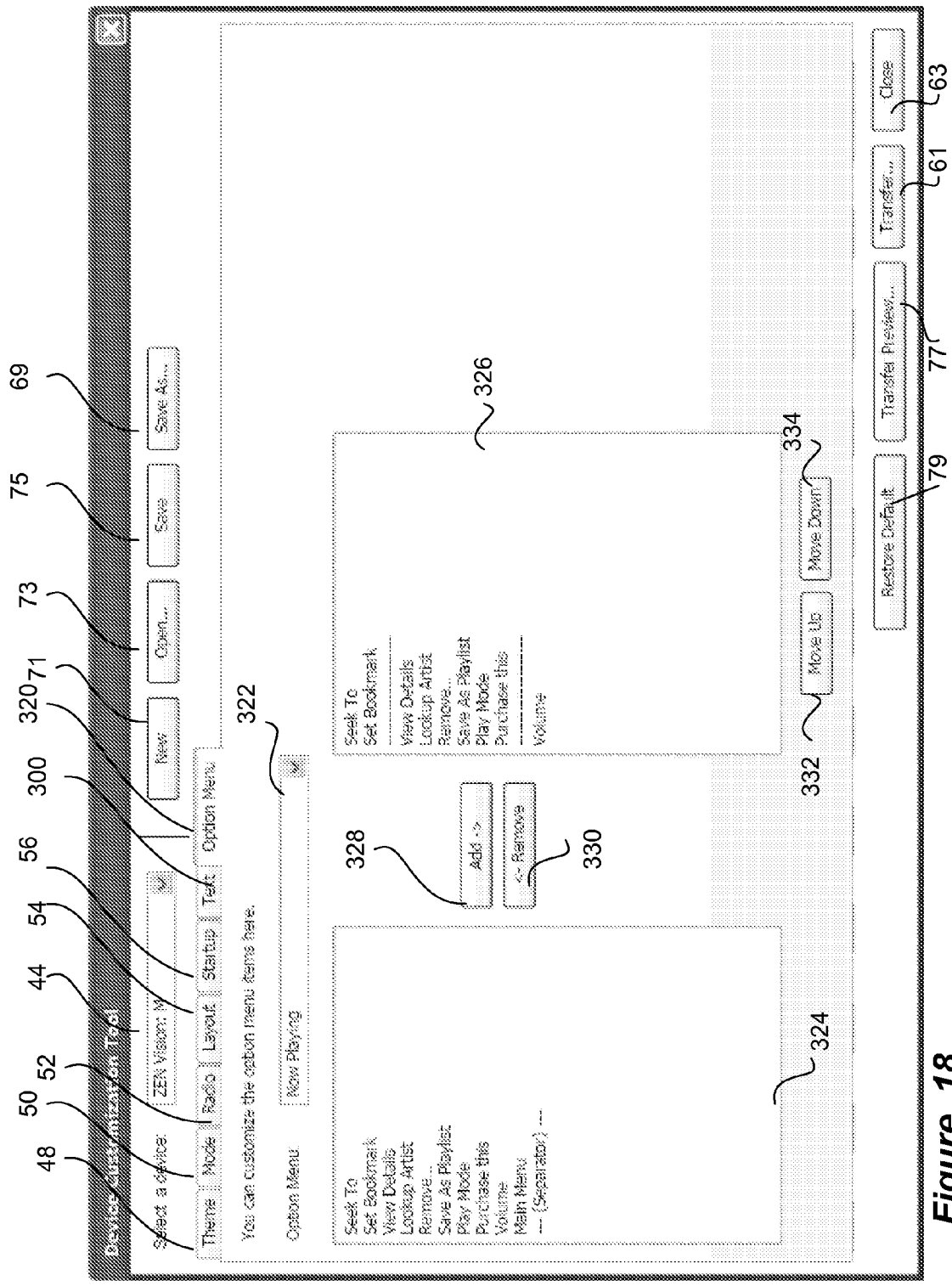
Figure_18

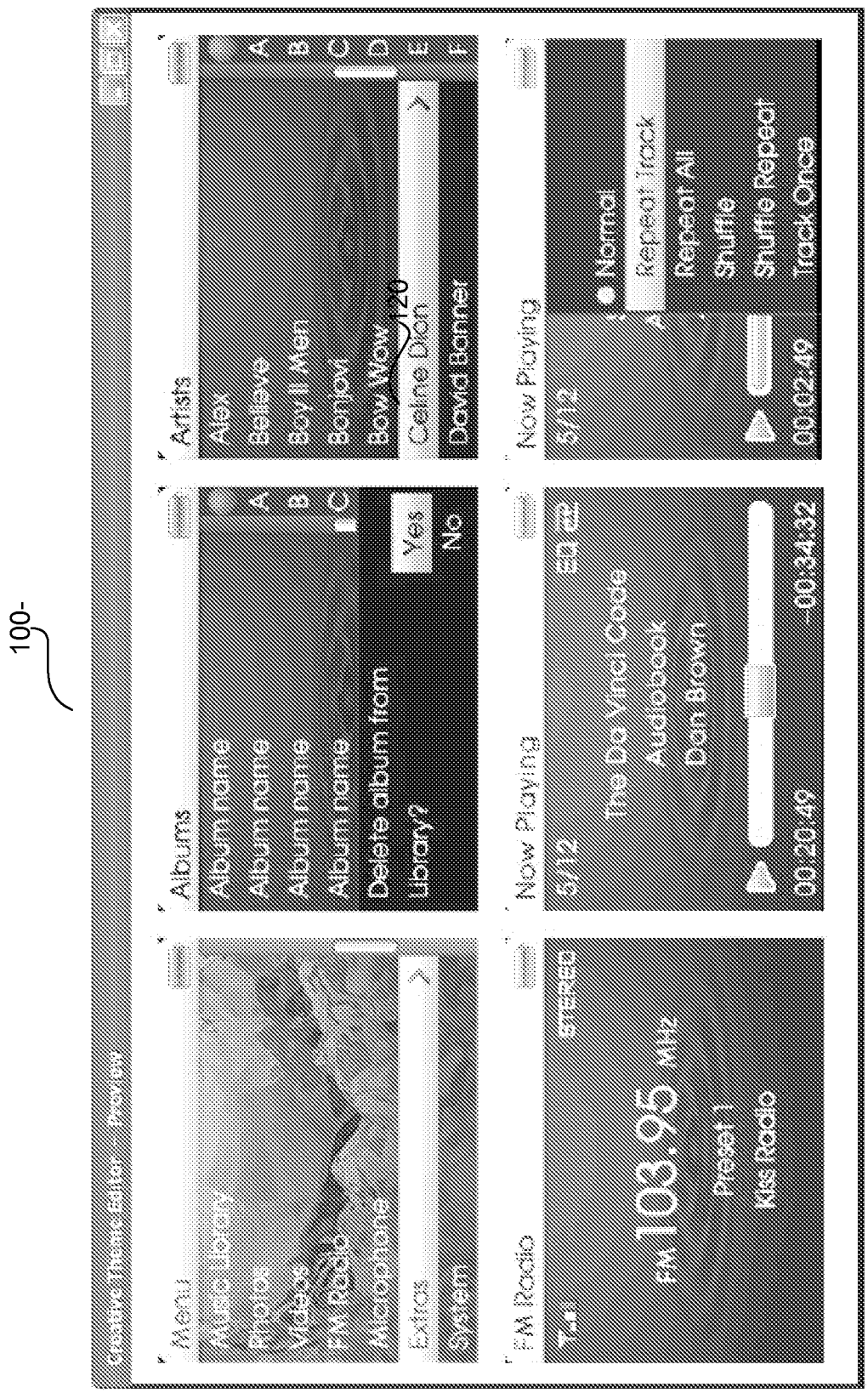
Figure_19

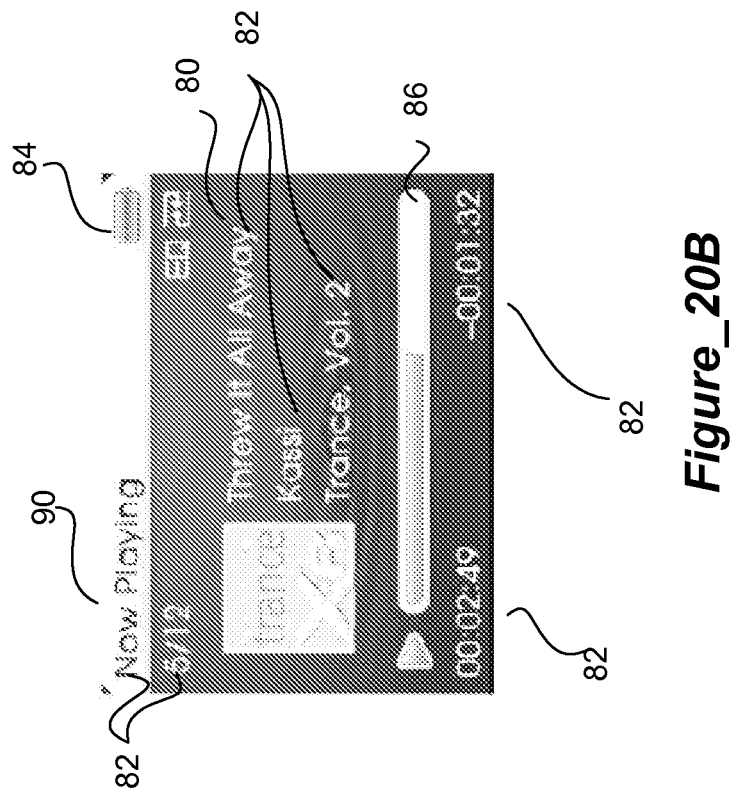
*Figure_20B*
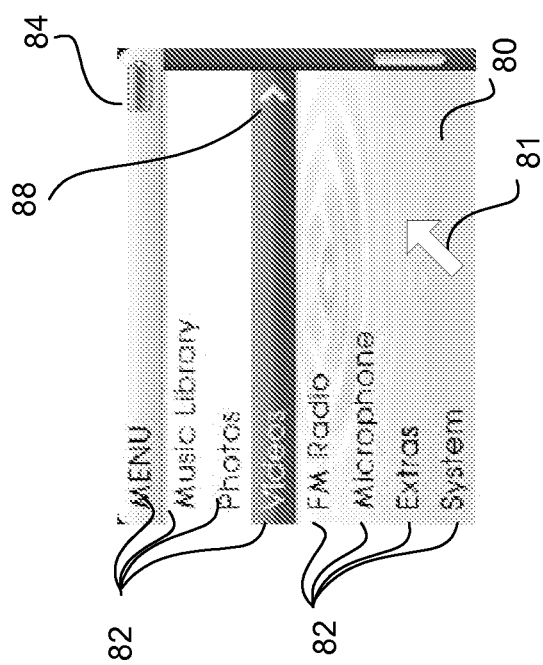
*Figure_20A*

HOST IMPLEMENTED METHOD FOR CUSTOMISING A SECONDARY DEVICE

FIELD OF INVENTION

This invention relates to a method for customizing a secondary device, the method being directed primarily at, but not exclusively to, redefining at least one user interface element in the secondary device.

BACKGROUND

We are currently in an era where individuality is a trait highly desired by the masses. There are countless expressions of individuality in the media, especially on the world wide web in the form of blogs, podcasts, online journals, and the like. In this information age, originality and individuality are some factors which ensure that interest in a particular expression of individuality is sustainable. Similarly, players in popular online games like Second Life and World of Warcraft use the games as outlets to express their individuality in terms of defining their game characters' skills, appearance and persona.

A consequence of the advent of the information age has been the increasing adoption of portable digital devices by the masses. While there are certain devices, such as, for example, mobile phones and portable media players that have become nearly ubiquitous, many of the users would prefer that their own device is different (special) compared to other users' devices. There are already ways to differentiate an exterior aspect of such devices, such as by using paint on casing, adhering shimmery bits to the casing, adhering decals, using coloured silicone skins and the like.

There are also ways to differentiate an appearance of an interface for such devices, but the current ways to do so are limited to only changing themes, wallpaper and shortcuts, which effectively minimizes the possible variations of changing the interface appearance of such products. It is thus difficult to obtain a unique interface for such devices. The users also currently face difficulty in altering a usability of their devices.

SUMMARY

There is provided a host implemented method for redefining at least one user interface element on a secondary device. The method may include connecting the secondary device to the host for communication between the host and the secondary device; redefining the at least one user interface element using an application running on the host; reviewing the at least one user interface element as redefined using the application (possibly including a visual preview of the at least one user interface element as redefined when viewed on the secondary device); determining whether the secondary device is able to support the at least one user interface element as redefined using the application; and incorporating the at least one user interface element redefined using the application onto the secondary device. Support for the at least one user interface element may depend on parameters such as, for example, amount of onboard memory, amount of onboard storage capacity and display capability for the secondary device. The application running on the host either may be manually activated or may be automatically activated.

The secondary device may be connected to the host via either a wired connection or a wireless connection. The wireless connection may be using wireless technologies such as, for example, Wifi, Bluetooth, WiMax, infra-red and UWB.

It is preferable that the at least one user interface element may be selected from for example, controls, cursors, background, text font, icons, progress bars, selector bars, and hierarchy of accessing data.

The host implemented method may further include approving transfer of the at least one user interface element as redefined using the application to the secondary device, after determining whether the secondary device is able to support the at least one user interface element as redefined using the application. It is preferable that user interface elements of the secondary device not being redefined using an application running on the host are unaffected subsequent to the incorporation of the at least one user interface element redefined using the application.

It is advantageous that the secondary device may be able to transfer at least one user element to a second host to redefine least one user interface element on the second host. The first and second hosts may be either a PC or a server.

Preferably, the secondary device may be, for example, mobile phone, media player, PDA, and handheld games console.

Advantageously, redefining user interface elements may include actions such as, for example, changing controls, changing radio frequency ranges, changing radio frequency preset lists, changing animation sequences, cropping backgrounds, enlarging backgrounds, changing text font, changing text content, changing text location, changing cursors, changing icons, changing progress bars, changing selector bars, and changing hierarchy of accessing data. It is advantageous that the at least one redefined user interface element may form part of a theme for the secondary device.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

FIG. 2 shows a representative sample of a GUI for an application for redefining a user interface element.

FIG. 3 shows an intermediate step when redefining a user interface element (in this instance the background).

FIG. 4 shows a representative sample of a GUI for an application for redefining a user interface element. (in this instance a highlight bar).

FIG. 5 shows an intermediate step when redefining a user interface element (in this instance colour selection).

FIG. 6 shows a representative sample of a GUI for an application for redefining a user interface element. (in this instance a scroll bar).

FIG. 7 shows a representative sample of a GUI for an application for redefining a user interface element. (in this instance a message box).

FIG. 8 shows a representative sample of a GUI for an application for redefining a user interface element. (in this instance a search bar).

FIG. 9 shows a representative sample of a GUI for an application for redefining a user interface element. (in this instance a mode of operation).

FIG. 10 shows a representative sample of a GUI for an application for redefining a user interface element. (in this instance for radio functionality).

FIG. 11 shows a representative sample of a GUI for an application for redefining a user interface element. (in this instance a layout of a title bar).

FIG. 12 shows a representative sample of a GUI for an application for redefining a user interface element. (in this instance a layout of a context menu).

FIG. 13 shows a representative sample of a GUI for an application for redefining a user interface element. (in this instance a layout of a now playing screen).

FIG. 14 shows a representative sample of a GUI for an application for redefining a user interface element. (in this instance a layout of a radio screen).

FIG. 15 shows a representative sample of a GUI for an application for redefining a user interface element. (in this instance a layout of a recording screen).

FIG. 16 shows a representative sample of a GUI for an application for redefining a user interface element. (in this instance a startup sequence).

FIG. 17 shows a representative sample of a GUI for an application for redefining a user interface element. (in this instance text strings).

FIG. 18 shows a representative sample of a GUI for an application for redefining a user interface element. (in this instance menu entries and menu arrangement).

FIG. 19 shows a representative sample of a GUI of an application for previewing all changes to at least one user interface element.

FIGS. 20a and 20b show some representative examples of user interface elements.

DESCRIPTION OF PREFERRED EMBODIMENTS

Figure 1:
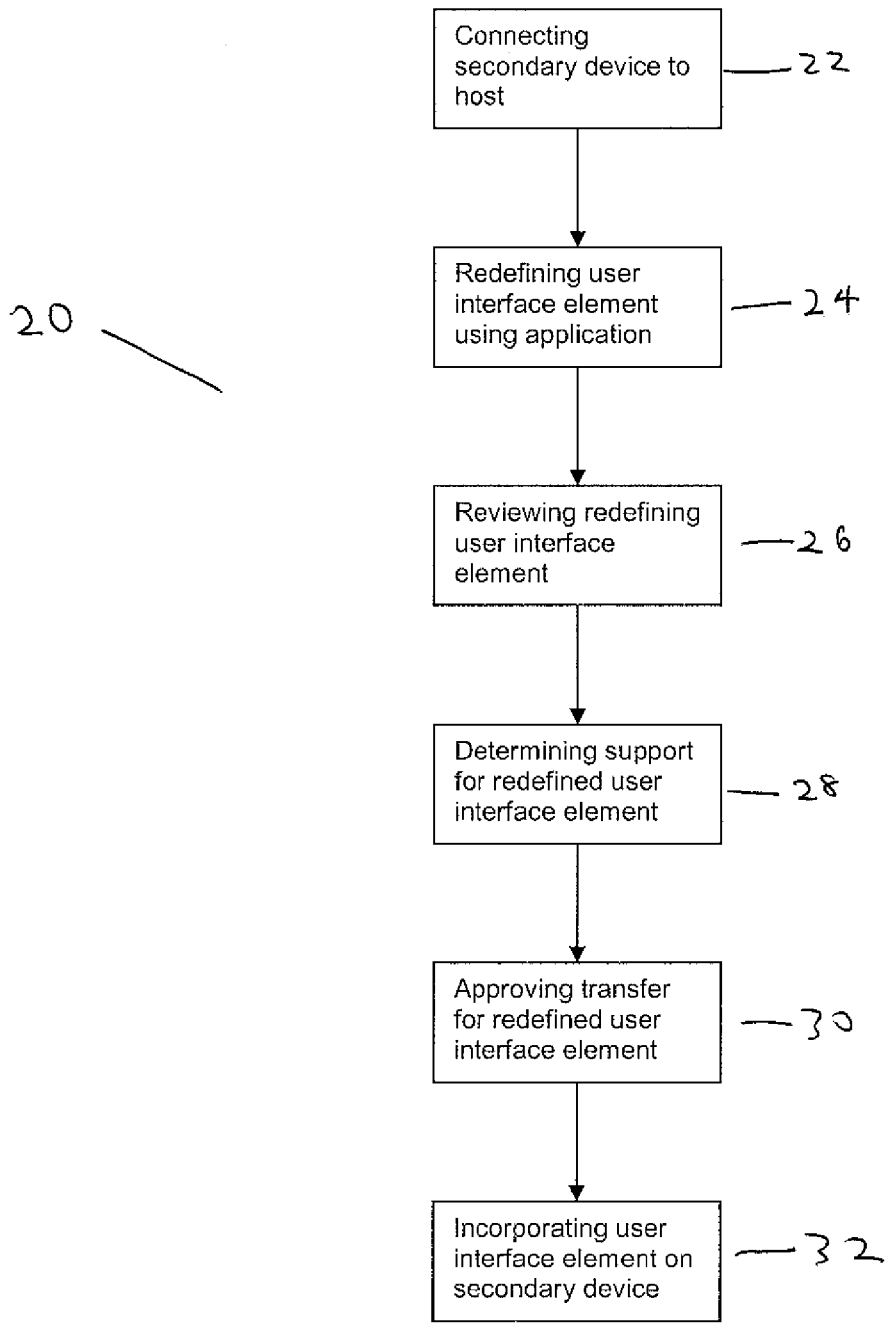
FIG. 1 shows a flow chart for a method of the present invention.

Referring to FIG. 1, there is provided a host implemented method 20 for redefining at least one user interface element on a secondary device. The host may be a PC, a server or any apparatus which is able to facilitate processing and transfer of data. The secondary device may be a portable digital device, such as, for example, mobile phone, media player, PDA, handheld games console and the like. FIGS. 20a and 20b show some representative examples of user interface elements found on the secondary device. The user interface element may be background 80, cursors 81, text font 82, icons 84, progress bars 86, selector bars 88, descriptive text 90 (eg "Now Playing" replacing "Current Song"), hierarchy of accessing data (not shown) and the like. The at least one redefined user interface element may form part of a theme for the secondary device, the theme generally affecting an appearance and usability of an interface of the secondary device.

The method 20 may include connecting the secondary device to the host for communication 22 between the host and the secondary device. The secondary device may be connected to the host via either a wired connection (cables) or a wireless connection. The wireless connection may be using wireless technologies such as, for example, Wifi, Bluetooth, WiMax, infra-red and UWB.

A user may access an application on the host which is able to redefine the at least one user interface element on the secondary device 24. The application on the host either may be manually activated by the user or may be automatically activated when the secondary device is connected to the host. The application may reside on any particular operating system. It is preferable that the application is activated only when the secondary device is connected to the host. However, the application may still be activated when the secondary device is not connected to the host if there is a database storing various themes for the secondary device (the database need not be on the host and may be stored in a remote server), with each of the various themes having user interface elements that are customizable using the application even when the secondary device is not connected to the host. Alternatively, there may be templates in the application to assist in creating a new theme for the secondary device. Thus redefining of the at least one user interface element on the secondary device may be enabled without having the connection to the secondary device.

Referring to FIG. 2, there is shown a representative sample of a GUI 40 for the application for redefining a user interface element. In this instance, the application may be known as the "Device Customisation Tool". In this instance, the application is being used to redefine a user interface element for a Zen Vision M media player by Creative Technology Ltd. A visual representation 41 of an existing interface of the Zen Vision M media player is shown in a first half 42 of the GUI 40. In the instance when the secondary device is not connected to the host, the visual representation 41 may be of a theme stored in the database mentioned earlier. A pull down menu 44 may show a list of secondary devices which are recognized by the application. The list of secondary devices need not be restricted to a particular type of device or devices made by a particular manufacturer. The list of secondary devices may be enlarged if the application detects connection of a compatible secondary device that is not in the list. A second half 46 of the GUI 40 may include tabs for redefining various aspects of the user interface elements. While the GUI 40 is shown to be split into two halves 42, 46, it should be noted that the GUI 40 may have as many portions as required.

The representative non-limiting tabs shown are Theme 48, Mode 50, Radio 52, Layout 54 and Startup 56. The tab currently being shown in the second half 46 of FIG. 2 is the Theme 48 tab. Selecting the Theme 48 tab allows the user to customize a most commonly viewed interface for the secondary device.

It can be seen that there are sub-tabs in the Theme 48 tab. A Background selection 58 sub-tab is shown for the Theme 48 tab. The user selecting a change button 60 would be redirected to a background sub-window 62 showing various backgrounds available for selection as depicted in FIG. 3. The background may be images in file formats such as, for example, jpg, bmp, gif, tiff, png and the like may also be used as backgrounds. Selecting a desired image from a selection window 64 would be required for background selection. The background sub-window 62 also includes a preview portion 66 which enables cropping using selector bar 68 of the desired image for use as the background of the most commonly viewed interface for the secondary device. The cropped view of the desired image is then shown in a central screen 59 of the Background selection 58 sub-tab. While the background sub-window 62 shown is of a MS Windows-centric format, it should be noted that it should not be deemed to be a limiting representation. The user may also be able to select a colour of text when not highlighted by a highlight bar by selecting a first change button 72. Selecting the first change button 72 may activate a colour palette 120 for colour selection of the colour of text as shown in FIG. 5. The user may also be able to select a colour of title bar text by selecting a second change button 122. Selecting the second change button 122 may also activate the colour palette 120 for colour selection of the colour of title bar text as shown in FIG. 5.

It can be seen that there is a sub-tab for highlight bar selection 70 for the Theme 48 tab. The user selecting the highlight bar 70 sub-tab may be directed to an interface as shown in FIG. 4. It can be seen that a colour of the highlight bar and text colour when within the highlight bar may be varied using respective change buttons 124 which individually activate the colour palette 120 for colour selection as shown in FIG. 5.

There is also another sub-tab for scroll bar selection 74 for the Theme 48 tab. The user selecting the scroll bar 70 sub-tab may be directed to an interface as shown in FIG. 6. It can be seen that a colour of the scroll bar and a colour of a thumb within the scroll bar may be varied using respective change buttons 126 which individually activate the colour palette 120 for colour selection as shown in FIG. 5.

Another sub-tab for the Theme 48 tab is a Message Box 76 sub-tab. The user selecting the Message Box 76 sub-tab may be directed to an interface as shown in FIG. 7. It can be seen that a background colour of a message box and colour of text in the message box may be varied using respective change buttons 128 which individually activate the colour palette 120 for colour selection as shown in FIG. 5.

There is also shown a Search Bar 78 sub-tab with the Theme 48 tab. The user selecting the Search Bar 78 sub-tab may be directed to an interface as shown in FIG. 8. It should be noted that the Search Bar (as shown) is an alphabet-based facility enabling access of files stored in a media player. The Search Bar may also be numeric based. It can be seen that a colour of text in the search bar and a colour of a highlight ball may be varied using respective change buttons 130 which individually activate the colour palette 120 for colour selection as shown in FIG. 5.

In a similar manner, selecting the Mode 50 tab allows the user to customize usability in specific modes when using the secondary device. The modes available may be dependent on the secondary device. The modes are, for example, radio, video player, picture frame, shuffle, party, audio recorder, audio book reader and the like. The user selecting the Mode 50 tab may be directed to an interface as shown in FIG. 9. The user may select a mode (functionality) from a list of modes 140 and may be able to define functions for each control on the secondary device in the particular mode. A representation of controls for the secondary device is provided, and a pull-down menu 144 is available to allocate a function for each control in the particular mode. The pull-down menu 144 may generally include standard options in the particular mode, such as, for example, record, delete, or playback in audio recorder mode. In this regard, the user is able to customize usability of the secondary device in each particular mode in accordance with the user's preferences.

Referring to FIG. 10, selecting the Radio 52 tab allows the user to set radio presets for various countries/states. The user would then be able to access pre-set radio stations in various countries/states which may have different frequency ranges. This assists the user where a majority of the radio stations make broadcasts in a language(s) that are not familiar to the user, and the user is able to zero-in on the radio stations which make broadcasts in a language(s) that is familiar to the user. Alternatively, the user may only want a list of radio stations broadcasting a particular genre of music in various countries/states which may have different frequency ranges. The user is able to specify bandwidth 150 such as, for example, FM, AM, SW, MW and the like. The country/state may also be specified 152. Finally, an editable listing 154 of the pre-set radio stations is also shown.

When the user selects the Layout 54 tab, the user is able to define layouts of screens in various modes of the secondary device. When the sub-tab Title Bar 160 is selected (as shown in FIG. 11), it can be seen that an alignment for the title bar may be defined to be aligned 162 either at a top or bottom of a screen of the secondary device. The user may also select for text to be read in a right-to-left order rather than in an Anglicized left-to-right order by checking box 164. This facility of changing the order of reading text may enable the secondary device to be usable for users of languages other than English.

The user selecting a Context Menu 166 sub-tab may be directed to an interface as shown in FIG. 12. It can be seen that an alignment for the context menu may be defined to be aligned 168 either at a left or a right side of the screen of the secondary device.

When the user selects a Now Playing Screen 170 sub-tab that is depicted in FIG. 13, the user is able to rearrange a location of representations in the Now Playing Screen, the representations being, for example, Audio track information 172, status and playback progress bar 174, current mode 176, album art 178, track counter 180 and so forth. Rearranging the location of the representations on a template 182 by drag and place actions would enable the representations in the Now Playing Screen on the secondary device to be correspondingly rearranged. Similarly, when the user selects a Radio Screen 184 sub-tab that is depicted in FIG. 14, the user is able to rearrange a location of representations in the Radio Screen, the representations being, for example, antenna icon 186, current mode 188, tuning frequency information 190, preset station location 192, station name 194 and so forth. Rearranging the location of the representations on a template 196 by drag and place actions would enable the representations in the Radio Screen on the secondary device to be correspondingly rearranged. The user is also able to rearrange a location of representations in a Recording Screen when a Recording Screen 198 sub-tab is selected as shown in FIG. 15. The representations may be, for example, time elapsed for recording 200, remaining storage space for recording 202, scale denoting clarity of recorded sounds 204, and so forth.

It should be noted that when the user selects the Layout 54 tab, the user is also able to remove representations depicted in the sub-tabs 160, 166, 170, 184, 198.

Another tab that may be selected as shown in FIG. 16 is the Startup 56 tab. The user may change a startup animation sequence for the secondary device by selecting the Startup 56 tab. A sequence 210 of image frames is shown. A first image frame 212 denotes a first image shown during the startup animation sequence, with consecutive image frames being laid over the first image frame 212 in sequence. The image frames may be rearranged in the sequence 210 using drag and place actions. The images need not be related in any manner to each other, ie it may be a slide show of images of any type. The image in each frame may be varied by selecting respective change buttons 214. The user may also be able to preview a sequence of images during the startup animation sequence of the secondary device by selecting a start preview button 216.

Another tab that may be selected as shown in FIG. 17 is the Text 300 tab. The user may amend text strings in the secondary device by selecting the Text 300 tab. An "original" window 302 denotes the default text strings used in the secondary device. A "my text" window 304 denotes the text strings that will replace those in the secondary device. For example, the terms "Music Library" and "FM Radio" are replaced by "My Songs" and "My Radio" respectively. FIG. 17 denotes other amendments as well. The text strings in the "original" window 302 are locked and may not be amended. However, the text strings in the "my text" window 304 may be amended by selecting and amending the text strings. The side-by-side arrangement of the "original" window 302 and the "my text" window 304 enables the user to confirm that a correct text string is amended when compared to the default text strings.

A final tab that may be selected as shown in FIG. 18 is the Option Menu 320 tab. Selection of the Option Menu 320 tab may enable the user to customize various menus in the secondary device. A pull-down menu 322 may be available to select a menu which the user would like to customize. The user may be able to add/remove different options from a menu and rearrange their order in the menu. FIG. 18 depicts a selection of the "Now Playing" menu. A first list 324 shows default options and a default arrangement of the options in the "Now Playing" menu. A second list 326 shows amended options (removal of a "Main Menu" option) and an amended arrangement of the options in the "Now Playing" menu. An "add" button 328 may be triggered to add an option(s) from the first list 324 to the second list 326. Similarly, a "remove" button 330 may be triggered to remove an option(s) from the second list 326. A "move up" button 332 and a "move down" button 334 may be triggered to arrange the options in the second list 326.

In the GUI 40, a "new" button 71 may be triggered when the user would like to define a new theme for the secondary device. An "open" button 73 may be triggered when the user would like to amend at least one user interface element of an existing theme for the secondary device. Triggering a "save" button 75 may be to store a theme as amended while triggering a "save as" button 69 may be to save a theme using an alternative moniker. Consequently, triggering a "close" button 63 would cease operations of the GUI 40 for the application for redefining a user interface element. A "restore default" button 79 may be selected to restore all factory settings in relation to the user interface elements for the secondary device.

Subsequent to redefining at least one user interface element using the application, the at least one user interface element as redefined may be reviewed 26. Reviewing the at least one user interface element may include a visual preview of the at least one user interface element as redefined when viewed on the secondary device. The visual preview of the at least one user interface element as redefined may be one aspect of the application and may be enabled by pressing a transfer preview button 77 in the GUI 40 for the application for redefining a user interface element shown in FIG. 2. FIG. 19 shows a global preview screen 100 that is activated when the transfer preview button 77 is triggered in the GUI 40. The global preview screen 100 shows the various appearances of the interface (as defined by the user) of the secondary device subsequent to the changes made to the at least one user interface element using the application. If the user is not satisfied with the changes made to the at least one user interface element, the user may revert back to the various tabs 48, 50, 52, 54, 56 of the GUI 40 to make further changes to the at least one user interface element. It should be noted that reviewing the at least one user interface element may include a simulation of usability of the secondary device in relation to accessing different modes or switching between modes.

Next, a set of instructions running on the host may determine whether the secondary device is able to support all changes 28 made to the at least one user interface element. Checks to determine adequate support for all the changes made to the at least one user interface element may include, for example, amount of onboard memory, amount of onboard storage capacity, display capability (screen size and resolution) for the secondary device and so forth.

If the user approves of all the changes made to the at least one user interface element based on a review of the global preview screen 100, the user may trigger a "transfer" button 61 to activate transfer of the redefined at least one user interface element to the secondary device 30. Subsequent to the transfer of the redefined at least one user interface element to the secondary device, the redefined at least one user interface element may be incorporated onto the secondary device 32. This may require the secondary device 32 to be restarted. It should be noted that the "transfer" button 61 may be omitted from the GUI 40 as the transfer of the redefined at least one user interface element to the secondary device may be activated once it has been ascertained that the secondary device is able to support all the changes made to the at least one user interface element. The user interface elements of the secondary device that have not been redefined using the application running on the host may be unaffected subsequent to the incorporation of the at least one user interface element redefined using the application.

It may be possible for the secondary device to transfer the at least one user element to a second host to redefine at least one user interface element on the second host, such that the theme of the secondary device is carried over to the second host. The secondary device would need to be connected to the second host to enable inter-device communication. The secondary device may be connected to the second host via either a wired connection (cables) or a wireless connection. The wireless connection may be using wireless technologies such as, for example, Wifi, Bluetooth, WiMax, infra-red and UWB. The process of transferring the theme from the secondary device to the second host would be more direct as the second host would conceivably have better hardware resources and would be able to support nearly all themes transferred by the secondary device. A porting application running on the second host may be activated once a connection to the secondary device has been detected, and the porting application may include a control to activate transfer of the theme from the secondary device.

Whilst there has been described in the foregoing description preferred embodiments of the present invention, it will be understood by those skilled in the technology concerned that many variations or modifications in details of design or construction may be made without departing from the present invention.

The invention claimed is:

1. A method implemented by a host device for redefining at least one user interface element on a secondary device, the method including:
   connecting the secondary device to the host device for communication between the host device and the secondary device, the secondary device being operable in one or more modes;
   redefining the at least one user interface element using an application running on the host device in a manner wherein usability in the one or more modes is customizable;
   reviewing the at least one user interface element as redefined using the application, wherein reviewing the at least one user interface element comprises simulation of usability of the secondary device in relation to accessing different modes or switching between modes when the secondary device is operated in more than one mode;
   determining whether the secondary device is able to support the at least one user interface element as redefined using the application, wherein determination of whether the secondary device is able to support the at least one user interface element as redefined is based on at least one of amount of onboard memory, amount of onboard storage capacity and display capability for the secondary device;
   approving transfer of the at least one user interface element as redefined using the application to the secondary device, after determining whether the secondary device is able to support the at least one user interface element as redefined using the application, and incorporating the at least one user interface element redefined using the application onto the secondary device which is configurable to transfer at least one user element to a second host device to redefine at least one user interface element on the second host device wherein a theme of the secondary device is carried over to the second host device.

2. The method of claim 1, wherein the secondary device is connected to the host device via either a wired connection or a wireless connection.

3. The method of claim 2, wherein the wireless connection is using wireless technologies selected from the group consisting of: Wifi, Bluetooth, WiMax, infra-red and Ultra Wide Band (UWB).

4. The method of claim 1, wherein the at least one user interface element is selected from the group consisting of: controls, cursors, background, text font, icons, progress bars, selector bars, and hierarchy of accessing data.

5. The method of claim 1, wherein reviewing the at least one user interface element includes a visual preview of the at least one user interface element as redefined when viewed on the secondary device.

6. The method of claim 1, wherein user interface elements of the secondary device not being redefined using an application running on the host device are unaffected subsequent to the incorporation of the at least one user interface element redefined using the application.

7. The method of claim 1, wherein the host device is either a personal computer (PC) or a server.

8. The method of claim 1, wherein the secondary device is selected from the group consisting of: mobile phone, media player, personal digital assistant (PDA), and handheld games console.

9. The method of claim 1, wherein the redefining user interface elements includes actions selected from the group consisting of: changing controls, changing radio frequency ranges, changing radio frequency preset lists, changing animation sequences, cropping backgrounds, enlarging backgrounds, changing text font, changing text content, changing text location, changing cursors, changing icons, changing progress bars, changing selector bars, and changing hierarchy of accessing data.

10. The method of claim 1, wherein the at least one redefined user interface element forms part of the theme for the secondary device.

11. The method of claim 1, wherein the application running on the host device is either manually activated or automatically activated.

* * * * *